March 24, 1964 A. O. BEMISS ETAL 3,126,161

SELF-THREADING DEVICE

Filed July 21, 1960 3 Sheets-Sheet 1

ALBERT O. BEMISS &
GEORGE D. REHKLAU
INVENTORS

BY Harvey G. Lowhurst

ATTORNEY

ALBERT O. BEMISS &
GEORGE D. REHKLAU
INVENTORS

BY Harvey J. Lambert

ATTORNEY

March 24, 1964 — A. O. BEMISS ETAL — 3,126,161

SELF-THREADING DEVICE

Filed July 21, 1960 — 3 Sheets-Sheet 3

ALBERT O. BEMISS &
GEORGE D. REHKLAU
INVENTORS

BY Harvey G. Lowhurst

ATTORNEY 3,126,161

SELF-THREADING DEVICE

Albert O. Bemiss, Burlingame, and George D. Rehklau, Menlo Park, Calif., assignors to Ampex Corporation, Redwood City, Calif., a corporation of California Filed July 21, 1960, Ser. No. 44,312
15 Claims. (Cl. 242—55.12)

This invention relates generally to tape-transport systems and in particular to the provision of means whereby a supply of tape is threaded and wound upon a reel.

A tape-transport system generally comprises a supply reel, a take-up reel, and a flexible tape extendable between the reels. The tape unwinds from the supply reel and winds upon the take-up reel during certain operations of the system, such as recording operations and erase or transfer operations: and the tape unwinds from the take-up reel and winds upon the supply reel during an operation hereinafter referred as the rewind operation.

A revolving shaft or cylinder serving as a capstan is generally positioned between the reels in the path the tape is intended to follow, and an idler wheel is positioned adjacent the capstan and in pressure contact with the capstan so that when the tape is interposed in the nip between the capstan and the idler wheel, it will be moved in a direction tangent to the capstan and towards the take-up reel. The capstan may be geared to and driven by a separate motor preferably at a constant speed, or may be powered by one of the reel motors. Although a rotational torque is imparted to the reel shafts by the motors, it is the capstan that actually imparts motion to the tape. The motors connected to the reels exert torques in opposite directions during the recording operation, and the torque imparted to the reels is sufficient only to supply tension to the tape.

A tension arm is generally positioned between the take-up reel and the capstan to compensate for any slack that may occur in the tape and also to provide a means whereby breakage or slackening in the tape may be sensed by the machine. Accordingly, the tension arm is connected to the electrical circuit of the machine in such a manner that if the tape should break or slacken, as when the trailing end arrives, the arm will drop a predetermined distance and cause the machine to stop.

At the present time, the threading of tape in the usual tape-transport system is accomplished manually by an operator who unwinds or pulls off a desired amount of tape from a supply reel, positions it in relation to the other elements of the apparatus, such as the recording, playback, and erase heads of a magnetic tape recorder, and then connects it to a take-up reel while manually rotating this reel to start the tape winding upon it. Both reels of the system are normally stationary during this operation except for the rotations manually imparted to the take-up reel. As might be imagined, this conventional threading and connecting method is both awkward and time consuming. Occasionally, the operator will not properly position the tape in front of the magnetic heads and thus cause poor operational characteristics in the apparatus. Further, the connecting of the tape to the take-up reel has always been tedious, generally requiring the operator to insert the tape into a slot in the hub of the reel, while at the same time rotating the reel until enough tape has been wound upon the reel hub to retain the tape in this position.

Briefly, the present invention envisions an extendable-retractable element such as an elongated leader strip connected to the leading end of the tape and coiled in a retracted position on the supply reel. When the device is set in operation, means are provided to peel off the leader strip in the course of its rotation and to cause the strip to extend itself to the take-up reel. The strip and take-up reel are formed for automatic engagement so that the leader strip, upon extension, is coiled upon and retracted to the take-up reel, drawing the tape in train. The leader strip and reels also form a device by means of which tape may be manually threaded merely by holding the end of the leader strip between the rotating plates of the take-up reel, the remainder of the threading operation being automatic.

It is an object of the present invention to provide an improved arrangement for connecting a tape to a reel.

It is another object of the invention to provide means for automatically threading tape from a supply reel to a take-up reel and connecting the tape thereto.

It is still another object of the invention to provide means for automatically connecting a strip to a reel when the strip is held adjacent thereto.

It is a further object of the invention to provide means for retaining a strip in coiled position on a reel.

It is still a further object of the invention to provide means for accurately positioning a tape throughout a tape transport system.

Other objects and advantages of the invention will become apparent with reference to the attached drawings, in which.

Figure 1:
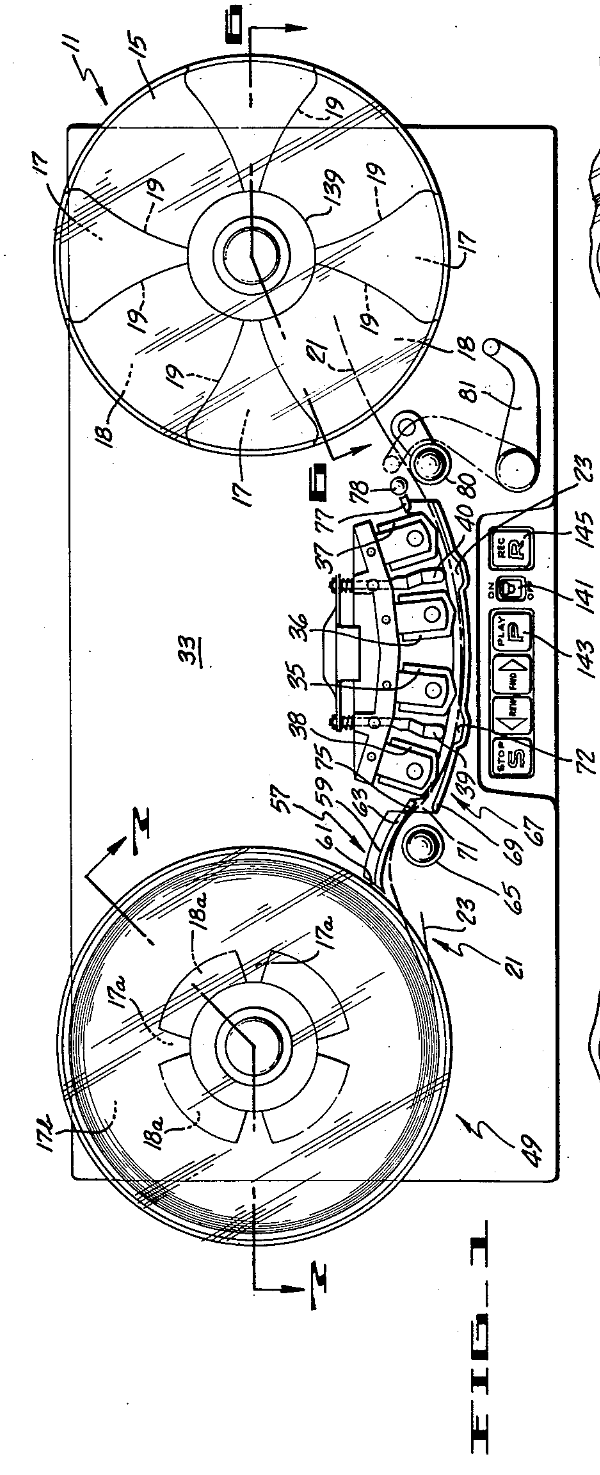
FIGURE 1 is a front elevation view of a tape transport including a self-threading device constructed in accordance with the invention.

In general, a tape-transport system in accordance with the present invention includes a reel 11 having spaced sides 13 and 15 which contain opposing tracks or plateaus 17 on their inner faces. The plateaus 17 are separated by a distance slightly greater than the width of the tape. The plateaus 17 are defined by ledges 19 which extend toward the periphery of the reel. The end of a tape 21 is provided with a widened head portion 23 adapted to cooperate with the ledges 19 such that when the end of the tape is inserted between the plates of the reel, it will be engaged by one of the ledges and moved toward the center of the reel.

Figure 6:
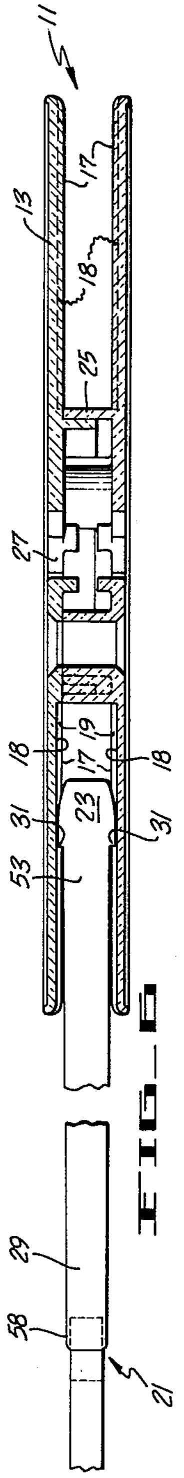
FIGURE 6 is a cross-sectional view, to an enlarged scale, of a portion of the apparatus of FIGURE 1, the view being taken substantially on the plane of lines 6—6 of FIGURE 1, and portions of the apparatus being shown in different positions.

More specifically, and with reference to FIGURES 1 and 6, the reel includes a cylindrical hub 25 having plates or sides 13 and 15 fixed at either end thereof and generally at a 90° angle to the hub axis. A central bore 27 is provided in the hub to receive a shaft upon which the reel may revolve. Means are provided for engaging the head 23 of the end of the tape when it is inserted between the plates 13 and 15, and comprise opposing plateaus 17 on the inner surface of each of the plates. The plateaus 17 are defined by ledges 19 which are generally at a right angle to the plane of the plates, and which extend from the periphery of the hub toward the periphery of the plates. The ledges 19 also define recessed areas 18 between adjacent plateaus.

As can be seen from FIGURE 6, a protrusion on the edge of the tape which forms an abutment with the lateral edge of the tape, such as a portion of the head 23, will be engaged by the ledges of the plateaus and cause the protruding portion of the tape to move toward the hub 25 following a path determined by the surface of the ledges. It has been found that the tape is more effectively drawn toward the hub of the reel when the ledges are curved rather than being radial lines. While other shapes, under certain conditions, serve the purpose, it has been found that a trochoidal curve is quite satisfactory.

The tape 21 which extends between and is wound upon the reel is provided at its leading end with an adapter or leader element 29, as shown in FIGURE 6. To facilitate the threading operation, this adapter or leader element may be separately fabricated of sheet material somewhat stiffer than the stiffness normally associated with such tapes, as will be demonstrated in due course. The adapter 29 is provided with means whereby it may engage the ledges 19 of the plateaus 17, and for this purpose includes an abrupt widening at its forward end to form the head 23. The rearward edge of the head 23 and the lateral edges of the adapter 29 intersect at generally a 90° angle, thus forming abutments 31 which engage the surfaces of the ledge 19 of the reel. The width of the head is slightly less than the distance between the plates 13 and 15 of the receiving reel in the areas where there are recesses 18, but is wider than the distance between the plates where the plateaus are opposite each other. Hence, the head of the adapter can enter the space between the plates of the reel, while still having the plane of the tape perpendicular to the planes of the plates, only in the areas where there are recesses.

The threading of the reels is accomplished as follows: the reel that is to receive the tape is caused to rotate. It is also preferable to simultaneously rotate the reel from which the tape is being unwound. As the receiving reel is rotating, the adapter 29 of the tape is inserted, or caused to be inserted, between the plates 13 and 15 of the reel. The head 23 of the adapter will ride along the circumference of the plates until it encounters a recess. When this occurs, the head 23 of the adapter will enter this area and the abutments 31 of the head will be engaged by the ledges 19. As the reel continues to revolve, the head will slide along the surfaces of the ledge and will be moved toward, and eventually contact the hub 25, whereupon the reeling operation will begin.

It will be noted that during the threading of the reel, only one side of the plateau was used, whereas there are arcuate ledges on both sides of each plateau. This symmetrical feature enables the reel to be placed upon the shaft with either plate adjacent the platform of the system.

It will be further noted that the preferred embodiment of the reels as illustrated in FIGURE 1 shows the outer faces of the plates as having a continuous surface. This feature adds an appreciable amount of strength to the plates and reduces the possibility of their becoming deformed. It also serves to prevent dust from encountering the edges of the tape. The continuous surface of the outer face of the plates was not feasible previously, since the reel was threaded by inserting the tape into a slot in the hub, and holes had to be provided in the plates to allow access to this slot so that the tape might be guided into it.

An improved device has thus been described for threading tape upon a receiving reel while the receiving reel revolves. It is also possible, however, to provide a tape-transport system utilizing the above-described device and which requires no manual handling of the tape by the operator. While some modifications of the reels and tape are found preferable for this system, the basic features of the tape connecting arrangement are still utilized.

Figure 3:
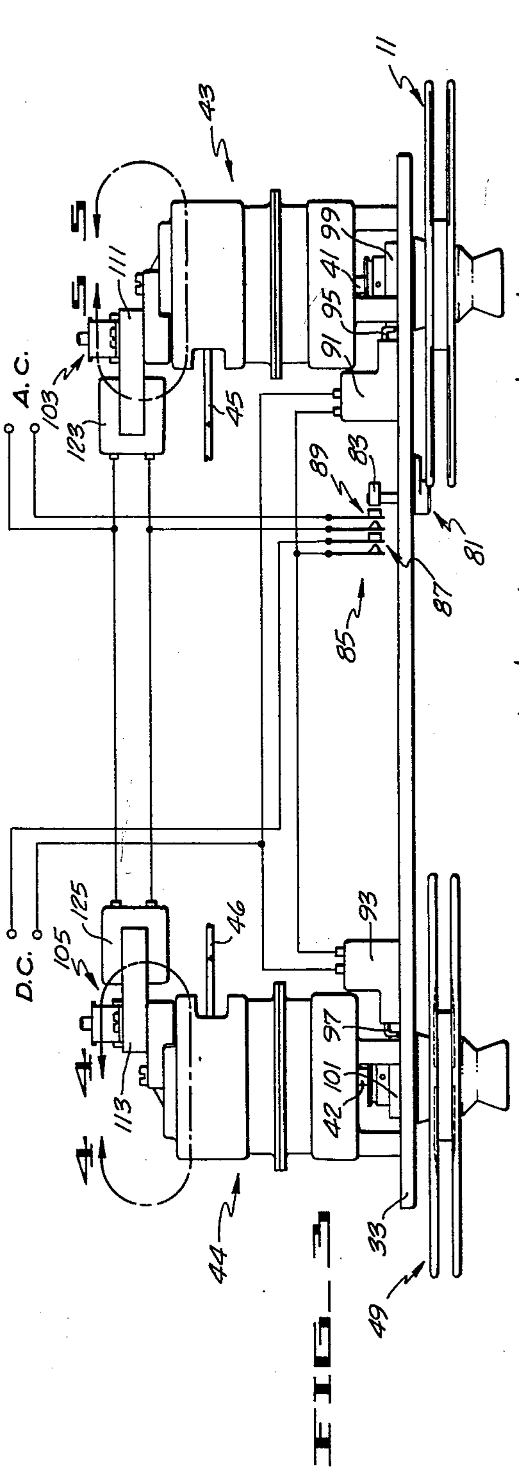
FIGURE 3 is a plan view, partly in phantom, of the transport of FIGURE 1, and also including a schematic representation of certain electrical circuits.

Accordingly, the improved tape-transport system includes a platform 33 which is adapted to support the various elements of the machine for which the system is provided. The elements shown in the preferred embodiment of FIGURES 1 and 3 include some common to conventional magnetic tape recorders, i.e., the three basic magnetic heads, namely the erase head 35, the recording head 36, and the playback head 37 together with a fourth head 38 for special uses. There is also shown a pair of extendable-retractable forks 39 and 40, for guiding the tape during rewind, shown in the retracted position. Further, the platform 33 as shown in FIGURE 3 is provided with openings (not shown) through which extend shafts 41 and 42. The shafts are connected, through clutches 43 and 44, and drive belts 45 and 46, to a suitable power source (not shown), which will cause them to revolve. Tape supporting reels 49 and 11 are fixably attached ot the shafts 42 and 41 respectively and revolve with the shafts when suitable power is supplied.

For ease of description, reel 49 will hereinafter be referred to the supply reel, and reel 11 as the take-up reel. The supply reel 49 and the take-up reel 11 vary slightly in design due to the difference in the manner in which they are used.

It will be noted that the plateaus 17*a* of the supply reel 49 extend from the hub of the reel toward the periphery of the plates, and that they merge into one continuous plateau 17*b* which extends around the periphery of the reel plates, so as to define recessed areas 18*a* between the plateaus 17*a* and 17*b*. The individual plateaus and ledges of the supply reel are not utilized during the threading of the tape to the take-up reel, or in the connecting of the tape to this reel. They are used, however, when the tape is originally placed on the reels at the time of manufacture, or, in some cases, are used to facilitate the rewind operation.

In order for the tape to be self-threaded past the head, it is desirable to provide a means for guiding the adapter or leader element 29 from a position on the supply reel 49 to the guide track between the reels.

Figure 7:
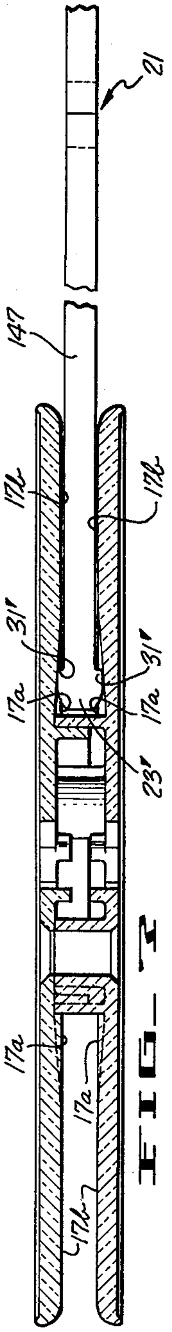
FIGURE 7 is a cross-sectional view, to an enlarged scale, of a portion of the apparatus of FIGURE 1, the view being taken substantially on the plane of lines 7—7 of FIGURE 1, and portions of the apparatus being shown in different positions.

As shown in FIGURES 6 and 7, the distance between the plates (plateaus) of the supply reel 49 is made to be less than the distance between the plates (plateaus) of the take-up reel 11; and the leader element 29, throughout its length from a point 53 immediately behind the head 23, is made to be of less width than the space between the take-up reel plateaus so as to move freely therebetween, but is of greater width than the space between the supply reel plateaus, so as to frictionally engage these plateaus when coiled upon the supply reel. Thus, the leader element maintains both itself and the tape in coiled position on the supply reel during ordinary handling or storage of the reel.

A stripper arm 57 is shown in FIGURE 1 as being immediately adjacent the supply reel at what would approximate the four o'clock position on the rim of the reel. When the head of the leader comes in contact with the stripper arm 57, the leader will be peeled from the reel, but the frictional contact between the inner faces of the plates of the supply reel and the remaining portion of the leader still in contact with the plates will continue to thrust the leader along the path direced by the stripping arm.

As a further feature of the invention, the leader element 29 is formed with a slight taper from the point 53 immediately behind the head, with the tapered edges converging toward the trailing end 58 of the leader, but with the width of the leader at the trailing end being nevertheless greater than the spacing between the plateaus of the supply reel. It has been found that the reel side plates, whether they are made of plastic as shown in the drawing, or of thin metal or other material, bend slightly outwardly under the wedging influence of the leader when it is coiled between the plates with the plates assuming somewhat dish-shaped, outwardly concave conformations. The taper of the leader ensures that the points of greatest frictional bearing between the leader and the side plates will be at the radially most outward loop of the leader coil, no matter how small is the length of the leader remaining coiled on the reel, so that the zone of the leader immediately trailing the extended portion is solidly engaged with the reel for the thrusting action described above.

The advantage of frictional contact between the lead adapter and the plates of the supply reel makes it desirable that the inner surfaces of the plates be continuous over that portion of the plates near the rim of the reel. As will be noted, therefore, in FIGURES 1 and 7 and as described more fully later, the plateaus of the supply reel merge in the region adjacent the periphery of the supply reel so as to provide a continuous base for thrusting action of the extended portion of the leader element (see below).

The stripper arm, in addition to stripping or peeling the lead adapter from frictional contact with the plates of the reel, also provides the initial guidance of the adapter so that it may pass with proper alignment past the other elements of the system. The stripper arm 57 comprises generally an arcuate bracket 59 having its forward edge 61 inclined to conform to the contour of the rim of the reel, and having its opposite edge 63 suitably adapted to abut the end of a stationary guide, hereinafter described. The stripper arm 57 is attached to the platform 33 by suitable fasteners (not shown).

Figure 2:
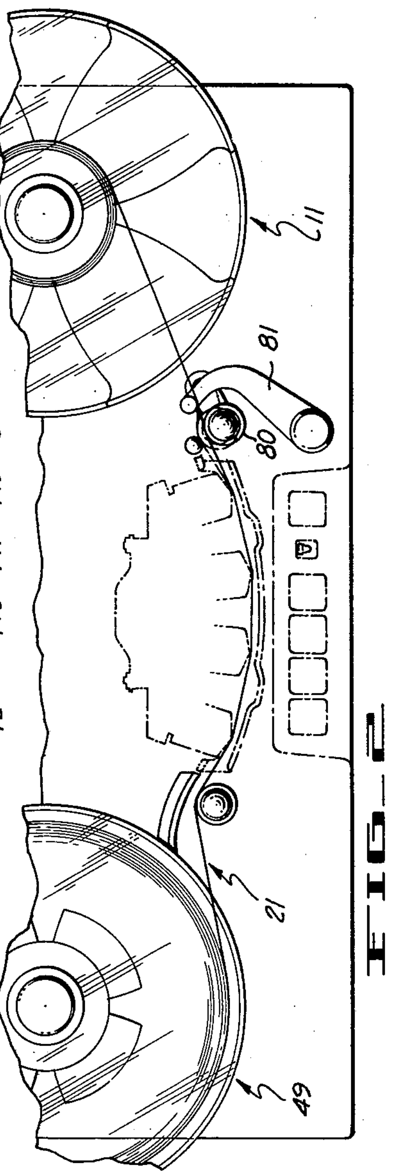
FIGURE 2 is a fragmentary elevation view, partly in phantom, of the transport of FIGURE 1.

An idler wheel 65 is shown located immediately adjacent the concave side of the stripper arm 53, and so positioned that the tape will pass over this wheel and cause it to revolve as the tape moves between the reels. As can be seen in FIGURES 1 and 2, the tape will continue to contact the wheel even after the conenction with the take-up reel has been completed. The wheel 65 may also function as an inertia wheel, tending to smooth out any variation in the speed of the tape as it is unwound from the supply reel.

Immediately upon leaving the stripper arm 57, the leader 29 will encounter the stationary guide 67. The function of this guide is to direct the tape past the elements of the system and at the same time assure that the tape will be properly aligned with these elements. Accordingly, the guide 67 includes a generally arcuate strip 69 and an upstanding rib 71 which extends along the length of the strip. The strip 69 has a pair of depressions 72 and 73 to accommodate the tips of the forks 39 and 40 in their extended positions (not shown). The rib 71 will control the lateral movement of the tape as it proceeds along the strip. At either end of the guide 67, the rib 71 projects outwardly into an arm which terminates in a forward ledge 75 and a rearward ledge 77 which are generally at a 90° angle to the arm and parallel to the strip 69. The arm also provides a lateral guide for the tape, and the ledges 75 and 77 serve to control the movement of the tape in a direction perpendicular to the plane of the tape. The ledge 75 generally abuts the stripper arm 57 at 63 so as to provide a continuous path for the tape from the stripper arm to the stationary guide. The ledge 77 is generally adjacent the capstan 78 and pressure idler wheel 80 (shown in a retracted position) so that an element of the tape upon leaving the stationary guide 67 will immediately pass through the space between the capstan and the idler wheel.

FIGURE 1 also shows a tension arm 81 immediately following the idler roller 80. Although the capstan normally imparts movement to the tape during recording and playing of the tape, such tape movement is not always desirable in the threading operation, and so the idler wheel is retracted to provide a temporary gap between the capstan and the idler wheel while the tape is being threaded so that tape movement is caused solely by the rotation of the supply reel. Also, it is normally desirable to have the tension arm 81 raised somewhat as shown in phantom in FIGURE 1 during threading and connecting so that the force of the arm will not be exerted upon the tape while the initial winding is being accomplished.

The raising of the tension arm is also made to serve a third purpose. As has been described, the shafts 41 and 42 normally exert torques in opposite directions upon the reels when the apparatus is playing or recording. During the threading process, it is desirable to have them exert torques and rotate in the same direction so that the tape will unwind from the supply reel and wind upon the take-up reel. The tension arm 81, which already is electrically connected to the system so as to stop reel rotation when the tape ceases to support it, as was previously discussed, is also adapted to vary the normal rotational direction of the reel motors when the arm is fully raised.

As shown in FIGURE 3 the arm 81 is connected as by a cam 83 to a switch 85, so that upon rotation of the arm 81 to its fully raised position as shown in dashed lines in FIGURE 1, the contacts 87 and 89 of the switch are closed. The closing of contacts 87 completes a direct-current operating circuit to a pair of solenoids (not shown) in a pair of brake assemblies 91 and 93, which are of a type well known in the art. Spring-loaded brake shoes 95 and 97 are withdrawn by the solenoids from braking positions engaging drums 99 and 101, which are solidly connected to the shafts 41 and 42, respectively, and the shafts are freed to rotate.

Figures 4, 5:
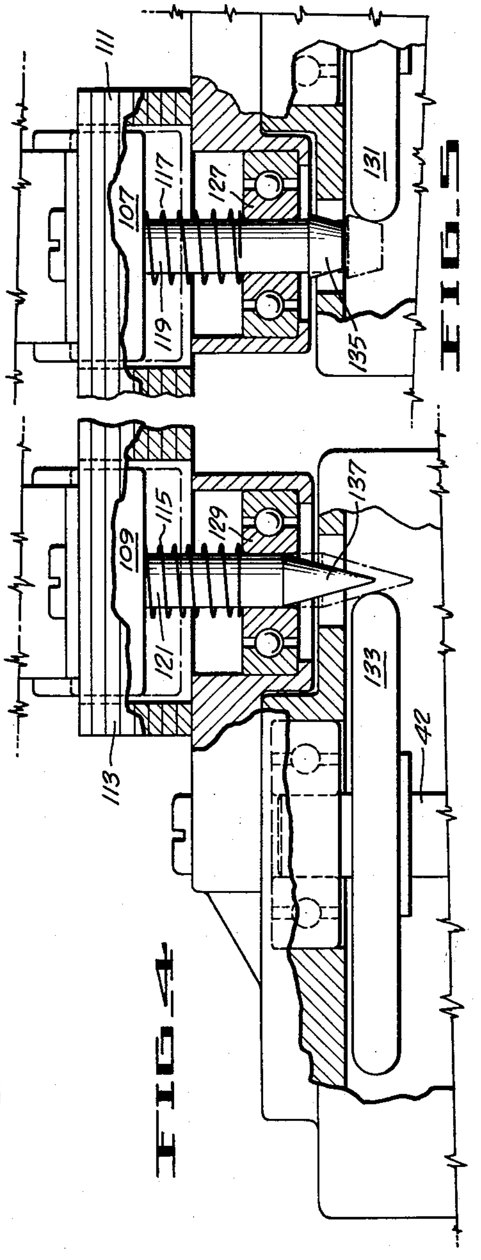
FIGURE 4 is a fragmentary broken-away plan view, to an enlarged scale, of the portion of the apparatus generally enclosed by the lines 4—4 of FIGURE 3.
FIGURE 5 is a fragmentary broken-away plan view, to an enlarged scale, of the portion of the apparatus generally enclosed by the lines 5—5 of FIGURE 3.

The closing of contacts 89 completes an alternating-current circuit to a pair of threading motors 103 and 105 mounted on the housings of the clutches 43 and 44. These threading motors are arranged to drive the shafts 41 and 42 independently of the clutches and of the belts 45 and 46 and in the same rotational directions. As shown in FIGURES 4 and 5, the armatures 107 and 109 of the threading motors are normally (when not operating) displaced axially from operating lateral alignment with the respective motor magnets 111 and 113, and are retained in these displaced positions by means of coil springs 115 and 117 mounted on the armature shafts 119 and 121. When the motor magnet coils 123 and 125 are energized by the A.C. circuit through contacts 89, the fields of the magnets draw the armatures against the urging of springs 115 and 117 and into operating lateral alignment with the respective magnets, while at the same time causing the armatures to rotate. The shafts 119 and 121, sliding axially in anti-friction rotational bearings 127 and 129, are likewise drawn longitudinally into driving engagement (dashed outlines, FIGURES 4 and 5) with the peripheries of rubber-tired wheels 131 and 133, which are solidly mounted on the shafts 41 and 42, so that the shafts 41 and 42 are driven in the same rotational directions (counterclockwise as viewed in FIGURE 1).

It will be noted that the driving ends 135 and 137 of the shafts 119 and 121 are of different conformations. The end 137 of shaft 121 is of conical shape and is adjusted to engage the wheel 133 at a zone of the shaft representing a particular radius of the conical end, so as to drive the supply reel 49 at a particular rotational velocity and to thus impart a corresponding particular tangential or linear velocity to the supply reel at the radial position thereon occupied by the leading end of the tape 21 (i.e., in this example, the head 23 of the leader 29). Thus the leader, when it is stripped off and extended toward the take-up reel 11, will be traveling approximately at this particular linear velocity. It is desirable that the take-up reel be rotating during the threading process at a speed such that the linear velocity at the periphery 139 of the hub 25 is not less than the linear velocity of the head 23 of the leader, so that the leader head is certain to be caught up by the ledges 19 and urged into threaded position against the hub 25. To effect this condition, the end 135 of the take-up reel threading motor armature shaft 119 is formed to a conical shape (in the illustrated example, a frustro-conical shape) and is adjusted so that in the engaged position (FIGURE 5), it engages the wheel 131 at a zone representing a substantially greater radius of the conical end 135 than the engaging-radius of the end 137 of the supply reel threading motor armature shaft 121. Thus the take-up reel is made to rotate angularly faster than the supply reel, and the hub-periphery linear velocity of the take-up reel is adjusted to be not less than the linear velocity of the leader 29.

Figures 8, 9, 10, 11:
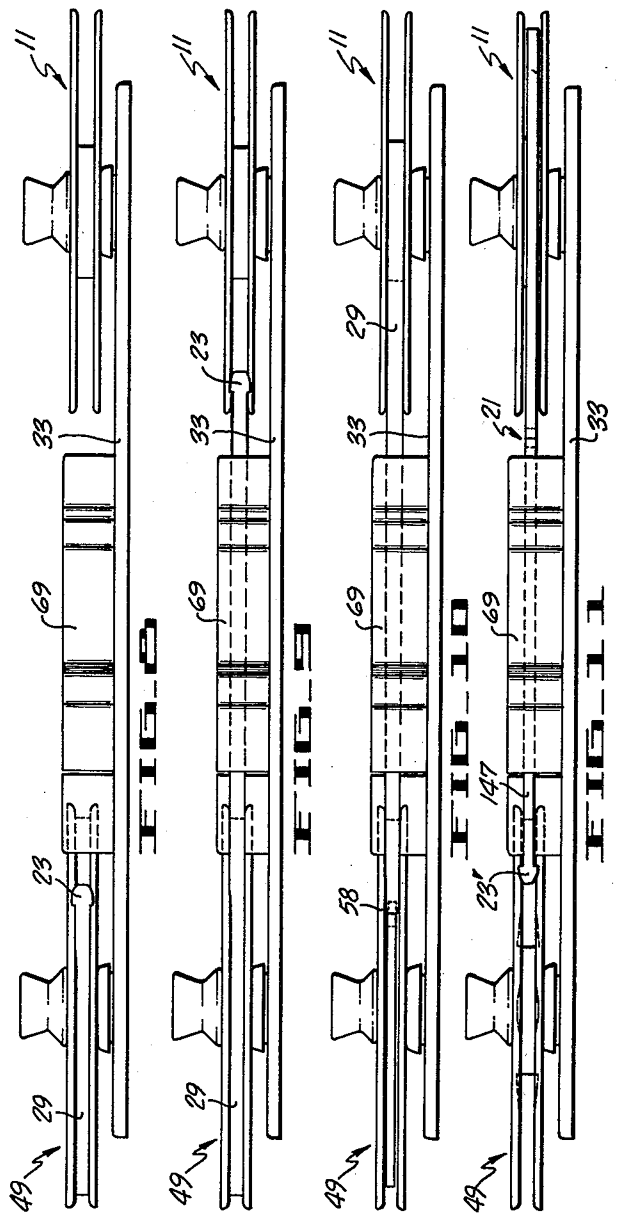
FIGURE 8 is a bottom plan view of portions of the apparatus of FIGURE 1, illustrating a stage of operation.
FIGURE 9 is a bottom plan view similar to FIGURE 8, illustrating a further stage of operation.
FIGURE 10 is a bottom plan view similar to FIGURE 9, illustrating a still further stage of the operation.
FIGURE 11 is a bottom plan view similar to FIGURE 10, illustrating a further stage of the operation.

In operation, the procedure is as follows: First the supply reel 49, on which is coiled the particular tape that it is desired to thread, is mounted on the shaft 42, the head 23 of the leader being located at random but pointing in the direction of operating rotation. A machine operating switch 141 is turned to "On" position either after or before the supply reel is mounted. In the "On" position, the switch 141 causes the main operating motor (not shown) to operate the belts 45 and 46 in the normal playing mode, but the shafts 41 and 42 are disengaged through the clutches 43 and 44 and do not rotate. By hand, the operator lifts the tension arm 81 to the fully raised position (dashed outline, FIGURE 1), putting the tape-bearing portion in a position of elevation over the tape-threading path, and at the same time closing the switch 85 and actuating the threading motors 103 and 105 to cause the reels to rotate in threading mode (FIGURE 8). The leader 21 is stripped head-first from the reel 49 by bracket 59 and, impelled by its remaining frictional engagement with the rotating reel 49, extends between the set of heads 35—38 and the guide 67, between the capstan 78 and the pinch roller 80 (which is retracted as shown in FIGURE 1), beneath the bearing portion of the tension arm 81, and between the plates of the rotating take-up reel 49 (FIGURE 9), where the ledges 19 engage the projections 31 and conduct the leader head 23 to the hub 25; and the leader is thus coiled in a second retracted position on the hub as shown in progress in FIGURE 10, drawing the tape in train. At any time after the leader is securely engaged the tension arm 81 is released and drops back to engage and tension the tape (FIGURE 2). In this position of the arm 81 the switch 85 is open, and the threading motors 103 and 105 are stopped and disengaged. The "Play" button 143 or the "Record" button 145 may then be pressed to actuate the machine in its normal operating mode, with the clutches 43 and 44 engaged and the pinch roller 80 in pinching or capstan-driving position (dashed outline of FIGURE 2).

The trailing end of the tape may be connected to the supply reel hub in any suitable way; but for ease in removal and re-connection, this end is here shown (FIGURES 7, 11) as fitted with an adaptor or trailer element 147 of semi-flexible material and of generally the same width as the tape, the element having an enlarged head portion 23′ and projections 31′. It is not necessary for this element 147 to be tapered, because no frictional contact with the plates of either reel is needed. In connecting or disconnecting this element with the supply reel ledges 19*a* and recessed areas 18*a*, as shown in FIGURES 7 and 11, the element may be slightly canted so as to pass between the continuous peripheral plateaus 17*b* of the reel.

Thus there has been described a self threading device in which an extendable-retractable leader element is connected to the leading end of a tape and in which means are provided to cooperate with the rotation of the supply reel to cause extension of the leader element to the take-up reel, means also being provided for cooperating with the rotation of the take-up reel to engage the leader and cause it to assume a second retracted position adjacent the take-up reel hub, drawing the tape in train; the last-named means also being suitable for manual threading of the machine.

Various changes and modifications may be made in the above described apparatus without departing from the spirit of the invention.

Various of the features of the invention are set forth in the following claims.

What is claimed is:

1. In a tape transport having forwardly rotating supply and take-up reels and a tape coiled on said supply reel, the improvement comprising: means including an extendable-retractable element connected to the leading end of said tape, said element being coupled to said supply reel for positively driven expulsion by and from said supply reel and extension to said takeup reel upon forward rotation of said supply reel; and means cooperating with the rotation of said take-up reel for causing automatic engagement of said element upon said extension with the hub of said take-up reel and retraction of said element from said supply reel to said hub, said means including means formed on and cooperating with the rotation of said takeup reel for receiving said extendable-retractable element at the periphery of said takeup reel and for automatically conducting said element to a position of retention adjacent the hub of said takeup reel, whereby said leading end of said tape is drawn to and is coiled upon said take-up reel hub.

2. In a tape transport having forwardly rotating supply and take-up reels and a tape coiled on said supply reel, the improvement comprising: an extendable-retractable element connected to the leading end of said tape and having a first retracted position engaging said supply reel and rotating forwardly therewith; means for engaging and diverting a portion of said rotating element toward said takeup reel and for thereby causing positively driven explusion of said element by and from said supply reel and extension of a portion of said element to said take-up reel; and means formed at least in part on and cooperating with the rotation of said take-up reel for automatically engaging and causing retraction of said element to said take-up reel hub, said means including a pair of spaced flanges extending from said takeup reel hub, said extendable-retractable element being formed with a portion wider than said tape, and said flanges and said portion being formed for mutual engagement to automatically draw said portion from the periphery of said flanges to the periphery of said rotating takeup reel hub, whereby said leading end of said tape is drawn to and is coiled upon said take-up reel hub.

3. In a tape transport having forwardly rotating supply and take-up reels and a tape coiled on said supply reel, the improvement comprising: an elongated leader element having a leading end and a trailing end connected to the leading end of said tape, said leader element having a first retracted position coiled on said supply reel radially outwardly from said tape and from end to end engaged with and retained by said supply reel; means cooperating with the forward rotation of said supply reel for progressively stripping said leader element from said supply reel beginning with said leading end of said element and for directing said element to a position of extension between said supply and take-up reels; and means cooperating with the rotation of said take-up reel for causing automatic engagement of said element and said take-up reel and positioning of said leading end of said element on the hub of said take-up reel, said last-named means including a pair of spaced flanges on said takeup reel, said flanges and said leader element being formed for mutual engagement to automatically draw said leader element from the periphery of said flanges to the periphery of said rotating takeup reel hub, whereby said element is retracted to a second retracted position coiled upon said take-up reel and said leading end of said tape is drawn to and coiled upon said take-up reel.

4. In a tape transport having rotating supply and take-up reels and a tape coiled on said supply reel, the improvement comprising: means formed on the leading end of said tape for engaging said take-up reel; and means immovably fixed on and cooperating with the rotation of said take-up reel for receiving said first-named means at the periphery of said take-up reel and for automatically conducting said leading end of said tape to a position of retention adjacent the hub of said take-up reel, said last-named means being formed on said takeup reel in such a way that the peripheral portions of said takeup reel remain circumferentially continuous and intact.

5. In a tape transport having rotating supply and take-up reels and a tape coiled on said supply reel, the improvement as characterized in claim 4, wherein said receiving means includes a track engageable with said first named means and running generally radially inwardly to the hub of said take-up reel.

6. In a tape-transport system which involves the use of a tape-supporting reel having spaced sides extending outwardly from a central hub, and a flexible tape capable of being wound upon said hub, the improvement which comprises at least one ledge positioned on the inner surface of at least one of said sides and extending from said hub to the periphery of said side, said ledge being spaced from the other side by a distance great enough to permit the tape to be wound on the reel between said sides, and a protrusion on at least one of the lateral edges of the tape and adjacent to its end, whereby the insertion of said end of said tape between the sides of said reel will cause said ledge to engage said protrusion and automatically propel said protrusion toward said hub and wind the end of the tape upon said hub when the reel revolves.

7. In a tape-transport system which involves the use of a tape-supporting reel, having spaced sides extending outwardly from a central hub, and a flexible tape capable of being wound upon said hub, the improvement which comprises opposing plateaus positioned on the inner surface of said plates and defined by ledges which extend from said hub to the periphery of said plates, each plateau being spaced from its opposing plateau by a distance great enough to permit the tape to be wound on the reel between the plates, and at least one end of said tape provided with an abruptly widened head portion, whereby the insertion of said head between the sides of said reel will cause said head to become engaged by said ledges and automatically propel said head inwardly and wind the end of the tape upon said reel.

8. In a tape-transport system which involves the use of a tape-supporting reel having a spaced parallel plates extending outwardly from a central hub, and a flexible tape capable of being wound upon said hub, the improvement which comprises opposing plateaus positioned on the inner surface of said plates and defined by curved ledges which extend outwardly from said hub to the periphery of said reel, each plateau being spaced from its opposing plateau by a distance great enough to permit the tape to be wound on the reel between the plateaus, at least one end of said tape provided with an abruptly widened head portion, having its rearward edge intersecting the lateral edge of said tape at approximately a right angle to form an abutment at said points of intersection, whereby the insertion of said head between the plates of said reel will cause the abutments of said head to become engaged by said ledges and automatically propel said head inwardly and wind the end of said tape upon said reel.

9. In a tape-transport system which involves the use of a supply reel and a take-up reel having spaced parallel plates extending outwardly from a central hub, means connected to said reels which will cause them to rotate, and a flexible tape capable of being wound upon said hub, the improvement which comprises pairs of opposing plateaus positioned on the inner surfaces of said take-up reel plates and defined by ledges which extend toward the periphery of said plates, each plateau being spaced from its opposing plateau by a distance great enough to permit the tape to be wound on the reel between said plateaus, but the spacing between said take-up reel plateaus being substantially greater than the spacing between said supply reel plates, a tape guiding means positioned between said reels on a predetermined tape path and including a bracket positioned adjacent the supply reel to assist in moving the tape from said reel, and an abruptly widened head portion provided for the end of said tape which is to engage the take-up reel, and with said end having a width immediately behind the point of abrupt widening of slightly greater than the distance between said plates of said supply reel so as to provide frictional contact between the edges of said end of the tape and said supply reel plateaus.

10. In a tape-transport system which involves the use of a' supply reel and a take-up reel having spaced parallel plates extending outwardly from a central hub, and a flexible tape capable of being wound upon said hub, the improvement which comprises pairs of opposing plateaus positioned on the inner surfaces of said reel plates and defined by ledges which extend toward the periphery of said plates, each plateau being spaced from its opposing plateau by a distance great enough to permit the tape to be wound on the reel between said plateaus but the spacing between said take-up reel plateaus being substantially greater than the spacing between said supply reel plateaus, a tape guiding means positioned between said reels along a predetermined tape path and including a bracket positioned adjacent the supply reel to assist in removing the tape from said reel, and abruptly widened head portions provided for the ends of said tape and having the end of the tape which is to engage the take-up reel provided with a width immediately behind the point of abrupt widening of slightly greater than the distance between said plates of said supply reel so as to provide frictional contact between the edges of said end of the tape and the plates of said supply reel.

11. In a tape-transport system which involves the use of a supply reel and a take-up reel having spaced parallel plates extending outwardly from a central hub, means associated with said reels for causing them to exert oppositely directed rotational torques, a tape tension arm positioned adjacent said take-up reel and operably connected to said means causing rotational torques in said reels, and a flexible tape capable of being wound upon said cylindrical hub, the improvement which comprises pairs of opposing plateaus positioned on the inner surfaces of said reel plates and defined by ledges which extend outwardly toward the periphery of said plates, each plateau being spaced from its opposing plateau by a distance great enough to permit the tape to be wound on the reel between said plateaus, a tape guiding means positioned between said reels along a predetermined tape path and including a bracket positioned adjacent the supply reel to assist in removing the tape from said reel, means associated with said tape tension arm and said reels for causing said reels to exert similarly directed rotational torques upon predetermined movement of said tension arm, and abruptly widened head portions provided for the ends of said tape and having the end which is to be connected to the take-up reel provided with a width slightly greater than the distance between said plates of said supply reel so as to provide frictional contact between the edges of the end of the tape and the plates of the supply reel.

12. In a tape transport having rotating supply and take-up reels and a tape coiled on said supply reel, the improvement comprising: an elongated leader element having a leading end, a mid-portion, and a trailing end connected to the leading end of said tape, said leader element being of substantially greater stiffness than said tape, at least said leading end of said leader element being substantially wider than said tape, said takeup reel having a hub and a pair of circumferentially continuous side flanges extending therefrom, said side flanges being spaced apart for a dimension on the order of the width of said wider leading end of said leader element and substantially greater than the width of said tape, and said wider leading end of said leader element and said side flanges being formed for at least radially slidable coupling of said wider leading end to and between said flanges at the peripheries thereof, so that said wider leading end and mid-portion of said leader element are caused to slide radially inward between said flanges as said takeup reel rotates, until said leader element is engaged with and wound upon said takeup reel hub.

13. In a tape transport having rotating supply and takeup reels and a tape coiled on said supply reel, the improvement comprising: an elongated leader element having a leading end, a mid-portion, and a trailing end connected to the leading end of said tape, said leader element being of substantially greater stiffness than said tape, at least said leading end of said leader element being substantially wider than said tape; means for causing frictional engagement between said leader element and said supply reel so that said leader element is caused to move with said supply reel when said supply reel is rotating in the tape unwinding direction; means cooperating with the rotation of said supply reel for progressively stripping said leader element from said supply reel beginning with said leading end thereof and for directing said leading end of said leader element toward said takeup reel, the driving force being transmitted through the portions of said leader element that remain in said frictional engagement with said supply reel; said takeup reel having a hub and a pair of circumferentially continuous side flanges extending therefrom, said side flanges being spaced apart for a dimension on the order of the width of said wider leading end of said leader element and substantially greater than the width of said tape, and said wider leading end of said leader element and said side flanges being formed for at least radially slidable coupling of said wider leading end to and between said flanges at the peripheries thereof, so that said wider leading end and mid-portion of said leader element are caused to slide radially inward between said flanges as said takeup reel rotates, until said leader element is engaged with and wound upon said takeup reel hub.

14. In a tape transport having forwardly rotating supply and takeup reels and a tape coiled on said supply reel, the improvement comprising: an elongated leader element having a leading end and a trailing end connected to the leading end of said tape, said leader element having a first retracted position coiled on said supply reel radially outwardly from said tape; said leader element being flared for a progressively increasing width from said trailing end to adjacent said leading end of said leader element so as to provide frictional engagement between said leader element and said supply reel in said first retracted position of said leader element; means cooperating with the forward rotation of said supply reel for progressively stripping said leader element from said supply reel beginning with said leading end of said element and for directing said element to a position of extension between said supply and takeup reels; and means cooperating with the rotation of said takeup reel for causing automatic engagement of said element and said takeup reel and positioning of said leading end of said element on the hub of said takeup reel, whereby said element is retracted to a second retracted position coiled upon said takeup reel and said leading end of said tape is drawn to and coiled upon said takeup reel.

15. In a tape transport having rotating supply and takeup reels and a tape coiled on said supply reel, the improvement comprising: means formed on the leading end of said tape for engaging said takeup reel; said means also being formed for engaging said supply reel and retaining said tape in coiled position thereon in the inoperative condition of said transport; and means formed on and cooperating with the rotation of said takeup reel for receiving said first-named means at the periphery of said takeup reel and for automatically conducing said leading end of said tape to a position of retention adjacent the hub of said takeup reel.

References Cited in the file of this patent

UNITED STATES PATENTS

| | | |
|---|---|---|
| 1,871,234 | Proctor | Aug. 9, 1932 |
| 1,920,657 | Morsbach | Aug. 1, 1933 |
| 2,366,147 | May | Dec. 26, 1944 |
| 2,891,736 | Blaes | June 23, 1959 |
| 3,006,650 | Ellmore | Oct. 31, 1961 |
| 3,090,574 | Doncaster et al. | May 21, 1963 |

FOREIGN PATENTS

| | | |
|---|---|---|
| 890,716 | Germany | Aug. 13, 1953 |